Patented May 7, 1946

2,399,687

UNITED STATES PATENT OFFICE 2,399,687

PREPARATION OF FINELY-DIVIDED SILICON DIOXIDE

Frederick L. McNabb, Akron, Ohio, assignor to The B. F. Goodrich Company, New York, N. Y., a corporation of New York No Drawing. Application May 29, 1942, Serial No. 445,073

1 Claim. (Cl. 23—182)

This invention relates to a method of preparing a finely-divided silicon dioxide that is especially suitable for compounding in rubber.

Silicon dioxide, or silica as it is more commonly known, has been proven to be very useful as a compounding ingredient in rubber compounding to give the rubber smoothness in texture and added resistance to tear. Before the silica can be used for this purpose, however, it is necessary that the silica be in a finely-divided condition and that it have no deteriorating action on the rubber or other compounding ingredients in the rubber, and also that it not unduly affect the rate of vulcanization of the rubber.

It is the object of this invention, therefore, to provide a method of making a silica that is extremely finely-divided, has no extraneous impurities, and is ideally suited for employment as a reinforcing pigment in vulcanized rubber.

I have discovered a method of preparing silicon dioxide in the form of very small particles possessing an average diameter of less than 0.10 micron. This silica does not contain any extraneous impurities and in its manufactured form is ideally suited for employment as a reinforcing pigment for rubber. The silica may be used like channel black for compounding in rubber and has properties quite similar to channel black.

In preparing the improved silica of this invention, I oxidize any of certain volatile silicon compounds by burning, thereby breaking down the molecule and forming a fume of silica. These fumes of solid silicon dioxide that are produced by burning are then collected as by collecting them on a surface, with the resultant production of a very pure finely-divided silica. With some of the silicon compounds used in this invention the heat of reaction must be applied from an outer source, preferably by mixing a combustible gas with the volatilized silicon compound and burning the mixture; the combustible gas supplying the heat necessary to oxidize the silicon compound to silicon dioxide. With other of the silicon compounds used in this invention it is possible to burn them directly without the addition of other combustible gases, as they themselves are combustible and burn readily.

In a preferred process I mix illuminating gas with ethyl silicate gas in approximately equal proportions and burn the mixture in a jet-type burner. The fumes of silica form immediately upon leaving the burning jet and are collected in a finely-divided condition on a metal or other surface placed in close proximity to the top of the flame. The collecting surface desirably progresses past the top of the burning jet and then to a collecting station at which the deposited silica is scraped off the surface. The silica so produced has an individual particle diameter of less than 0.10 micron and is very pure.

In this invention the silica is prepared by burning a silicon compound whose molecules contain no atoms other than silicon, carbon, hydrogen, and oxygen. These compounds include silicomethane, silicoethane, silicopropane, silicobutane, silicopentane, disiloxane, methyl silicate, ethyl silicate, methyl silicane, ethyl silicane, dimethyl silicane, diethyl silicane, tetramethyl silicane, tetraethyl silicane, ethoxytriethyl silicane, and the like. These are given merely as example, there being many other compounds of similar nature that will serve equally well in this invention.

Many of the silicon compounds useful in this invention will not in themselves support combustion and thus before burning require mixing with a combustible gas. Typical examples of those which will burn without the addition of any foreign combustible gas are dimethyl silicane, ethoxytriethyl silicane, methyl silicane, tetraethyl silicane, tetramethyl silicane, and triethyl silicane. Great care must be used if a compound such as tetramethyl silicane is employed as this compound spontaneously ignites with almost explosive violence upon its contact with the oxygen in air.

A wide variety of common exothermally combustible gases can be employed with the silicon compounds of this invention when necessary, as explained above. These common gases include producer gas, blue gas, illuminating gas, coal gas, water gas, refinery gas, natural gas, butane, propane, blast furnace gas, and the like. No particular proportion of combustible gas with the volatile silicon compound is essential since it is necessary only to supply sufficient gas to support combustion. In the case of the volatile silicon compounds which burn only by the application of heat, the oxidation is an endothermic reaction and the combustible gas with which the silicon compounds are mixed must be exothermic in order to supply the heat necessary for oxidizing the silicon. The amount of combustible gas that must be used will therefore depend upon the amount of heat released by the burning gases. While it is not necessary to mix a combustible gas with those volatilized silicon compounds which will themselves support combustion, such procedure is not prohibited and may, in some instances, be advantageous.

This application is a continuation-in-part of my co-pending application, Serial No. 310,825, filed December 23, 1939.

Having described my invention, together with a preferred embodiment of a method of practicing it and typical materials to be used, it is my intention that the invention be construed broadly within its spirit and scope as set out in the accompanying claim.

I claim:

The method of preparing silica which comprises admixing gaseous ethyl silicate with a combustible gas, burning the mixture, and collecting solid silicon dioxide from the vapors.

FREDERICK L. McNABB.